(12) United States Patent
Wille et al.

(10) Patent No.: US 7,500,112 B1
(45) Date of Patent: Mar. 3, 2009

(54) CRYPTOGRAPHIC DEVICE AND METHODS FOR DEFEATING PHYSICAL ANALYSIS

(75) Inventors: Thomas Wille, Hamburg (DE); Wolfgang Hass, Geesthacht (DE)

(73) Assignee: NXP B.V., Eindhoven (NL)

( * ) Notice: Subject to any disclaimer, the term of this patent is extended or adjusted under 35 U.S.C. 154(b) by 294 days.

(21) Appl. No.: 09/749,142

(22) Filed: Dec. 27, 2000

(30) Foreign Application Priority Data

Jan. 8, 2000 (DE) ................................ 100 00 503

(51) Int. Cl.
*G06F 21/00* (2006.01)
(52) U.S. Cl. .................. 713/194; 713/193; 713/340
(58) Field of Classification Search ............ 713/172, 713/174, 192–193, 200, 340; 380/29–30; 705/65
See application file for complete search history.

(56) References Cited

U.S. PATENT DOCUMENTS

| | | | |
|---|---|---|---|
| 4,813,024 A | 3/1989 | Lisimaque et al. | |
| 6,327,661 B1 * | 12/2001 | Kocher et al. | 713/193 |
| 6,419,159 B1 * | 7/2002 | Odinak | 235/492 |
| 6,490,353 B1 * | 12/2002 | Tan | 380/37 |
| 6,658,569 B1 * | 12/2003 | Patarin et al. | 713/194 |
| 6,725,374 B1 * | 4/2004 | Jahnich et al. | 713/190 |
| 6,804,782 B1 * | 10/2004 | Qiu et al. | 713/194 |
| 6,839,847 B1 * | 1/2005 | Ohki et al. | 713/194 |
| 6,839,849 B1 * | 1/2005 | Ugon et al. | 713/200 |

FOREIGN PATENT DOCUMENTS

WO    WO 99/49416    *   9/1999

OTHER PUBLICATIONS

Mano, "Computer System Architecture", 1993, Prentice Hall, 3rd Edition, pp. 489-491.*

* cited by examiner

*Primary Examiner*—Gilberto Barron, Jr.
*Assistant Examiner*—Minh Dinh

(57) ABSTRACT

The present invention relates to a data-processing device, particularly a chip card or smart card, and to a method of operating said device, with an integrated circuit comprising a central processing unit (CPU) (10) and one or more co-processors (12). The integrated circuit comprises a control unit (18, 30) which controls the processors, CPU (10) and co-processors (12) in such a way that, in the case of a cryptographic operation, at least two processors perform a cryptographic operation simultaneously and in parallel.

11 Claims, 1 Drawing Sheet

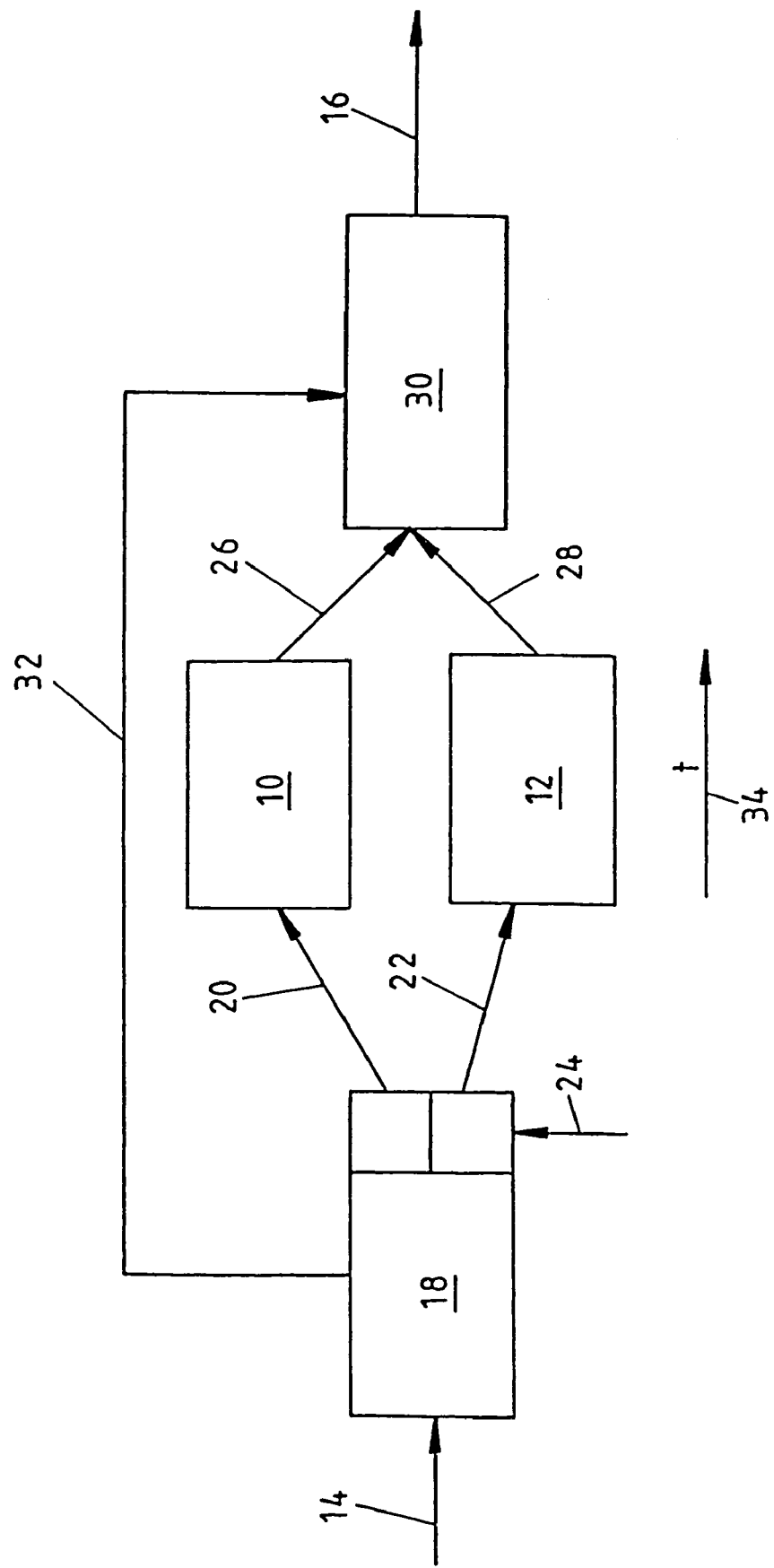

CRYPTOGRAPHIC DEVICE AND METHODS FOR DEFEATING PHYSICAL ANALYSIS

FIELD OF THE INVENTION

The invention relates to a method of operating a data-processing device, particularly a chip card or smart card, with an integrated circuit comprising a central processing unit (CPU) and one or more co-processors, in which the integrated circuit performs cryptographic operations, as defined in the pre-characterizing part of claim 1. The invention also relates to a data-processing device, particularly a chip card or smart card, with an integrated circuit comprising a central processing unit (CPU) and one or more co-processors, as defined in the pre-characterizing part of claim 10.

BACKGROUND

In many data-processing devices with integrated circuits, for example, cryptographic operations serve to protect the operation of these devices or to protect the data stored in the device. The computing operations required for this purpose are performed by standard processing units (CPU) and by dedicated crypto-processing units (co-processors). Typical examples are chip cards and IC cards such as, for example, smart cards. The data or intermediate results used in this respect is usually security-relevant information such as, for example, cryptographic keys or operands.

In the processing operations performed by the integrated circuit, for example, for computing cryptographic algorithms, logic combinations between operands and intermediate results are performed. Dependent on the technology used, these operations, particularly loading empty or previously erased memory areas or registers with data, lead to a higher current consumption of the data-processing devices. In complementary logics such as, for example, in CMOS techniques, a higher current consumption occurs when the value of a bit memory cell is changed, i.e. when its value changes from "0" to "1". The increased consumption depends on the number of bit positions changed in the memory or the register. In other words, loading of a previously erased register increases the current consumption proportionally with the Hamming weight of the operands (=the number of bits of the value "1") written into the empty register. By corresponding analysis of this current variation, it might be possible to extract information about the computed operations so that a successful crypto-analysis of secret operands such as, for example, cryptographic keys is possible. By performing a plurality of current measurements in the data-processing device, a sufficient extraction of the information could be made possible, for example, at very small signal changes. On the other hand, a plurality of current measurements could render a possibly required subtraction possible. This kind of crypto-analysis is also referred to as "Differential Power Analysis" by means of which an outsider can successfully perform an unauthorized crypto analysis of the cryptographic operations, operands and data only by observing changes in the current consumption of the data-processing device. The "Differential Power Analysis" thus provides the possibility of additionally gaining internal information of an integrated circuit beyond its sheer functionality.

A typical field in which the above-mentioned smart cards are used is, for example, in applications in which the smart card is used as a secure information memory. Cryptographic operations secure access to these applications in that the smart card independently performs encryption operations for the purpose of authentication. This is only possible by using a special smart card controller (microcontroller) which is controlled by suitable software. The communication channel between the smart card controller and the smart card terminal is directly secured by means of cryptographic methods whose security level essentially depends on the cryptographic algorithm used.

To be able to forge the authentication process for a smart card, it must be possible to emulate the authentication protocol by means of a copy. In secure protocols, this is only possible by analyzing the secret cryptographic key stored on the smart card.

Since smart card controllers are reproducibly operating machines, internal processors in the smart card controller can be determined and finally the secret key can be found by means of the analysis of indirect radiations of a smart card during operation, for example by measuring the time variation of the current consumption by means of the above-mentioned Differential Power Analysis. The reproducible, deterministic current profile for equal program sequences of a smart card control circuit is then analyzed.

An integrated circuit for storing and processing secret data is known from U.S. Pat. No. 4,813,024, in which a memory comprises a simulation memory cell having an identical current consumption as a memory cell which was not hitherto programmed. Fluctuations in the current and voltage are thereby only eliminated for the memory cell but not for processing the data.

SUMMARY

It is an object of the present invention to provide an improved method and an improved data-processing device of the type described above, which eliminate the above-mentioned drawbacks and complicate a Differential Power Analysis as much as possible.

This object is solved by means of a method of the type described above and as defined in claim 1 and by means of a data-processing device of the type described above and as defined in claim 10.

According to the invention, in a method of the type described above, at least two processors, CPU and co-processors, perform a cryptographic operation simultaneously and in parallel when performing a cryptographic operation in the integrated circuit.

This has the advantage that, in operation, a current consumption of the data-processing device is summed from each current consumption of the at least two parallel operating processors during a cryptographic operation, so that the individual current variations are no longer reconstructable. A Differential Power Analysis can thereby no longer be performed successfully.

Advantageous further embodiments of the method are defined in claims 2 to 9.

In a preferred embodiment, only the cryptographic operation of one processor, CPU or co-processor, is a useful operation, and all other cryptographic operations are dummy operations whose results are rejected, while optionally the selection as to which processor, CPU or co-processor, performs a useful operation is random-controlled.

In an alternative preferred embodiment, the cryptographic operation is split up in the sense of current consumption into two mutually complementary operations. When two identical co-processors perform the complementary cryptographic operations simultaneously, the current variations are also added complementarily so that a DPA can no longer be performed successfully or has to be more elaborate.

To achieve a very good encryption of the current curve used in the Differential Power Analysis and to compensate possible asymmetries in the identically constructed co-processors, the cryptographic operation is split up into sub-operations. The selection as to which co-processor performs which operation complementarily or not complementarily is random-controlled.

In a further alternative embodiment, a cryptographic operation is split up into at least two sub-operations, and the sub-operations are performed simultaneously and in parallel by the processors, CPU and co-processors, while subsequently corresponding sub-results are combined to an overall result of the overall cryptographic operation. Optionally, the split-up of the cryptographic operation into sub-operations is random-controlled. For example, the sub-operations are parts of an encryption in accordance with DES (Data Encryption Standard).

In a data-processing device according to the invention, the integrated circuit comprises a control unit which controls the processors, CPU and co-processors, in such a way that, in the case of a cryptographic operation, at least two of the processors perform the cryptographic operations simultaneously and in parallel.

This has the advantage that a current consumption of the data-processing device is summed from the relevant current consumptions of the at least two parallel operating processors during a cryptographic operation so that the individual current variations are no longer reconstructable. A Differential Power Analysis can therefore no longer be performed successfully.

Preferred further embodiments of the data-processing device are defined in claims 11 to 14.

In a preferred embodiment, the control unit comprises a splitter which splits up a cryptographic operation into at least two sub-operations and supplies them for simultaneous processing to two separate processors of the integrated circuit, CPU and co-processors, and the control unit further comprises a recombiner which recombines each sub-result of the sub-operations simultaneously performed by the processors.

To prevent a successful analysis of a current consumption curve during the cryptographic operation, the splitter is formed in such a way that at least one sub-operation is a dummy operation and in that the recombiner is formed in such a way that it rejects the relevant result of a processor that has performed a dummy operation.

A very good encryption of the current consumption curve is obtained in that the integrated circuit additionally comprises a random generator which is connected to the splitter in such a way that it operates in a random-controlled manner.

These and other aspects of the invention are apparent from and will be elucidated with reference to the embodiments described hereinafter.

BRIEF DESCRIPTION OF THE DRAWINGS

In the drawing:

The sole FIGURE is a block diagram of a part of an integrated circuit of a data-processing device according to the invention.

DETAILED DESCRIPTION

The sole FIGURE shows a part of an integrated circuit of a data-processing device (not further shown) which is, for example, a smart card or a chip card. The integrated circuit comprises a central processing unit (CPU) or a co-processor A 10, a co-processor B 12, a data input 14 and a data output 16. A splitter 18 which, in the case of a cryptographic operation to be performed by the integrated circuit, splits up this operation into first and second sub-operations in the form of a first data part 20 and a second data part 22, is arranged between the data input 14 and the CPU or a co-processor A 10 or the co-processor B 12. The first data part 20 is applied to the CPU or the co-processor A 10 and the second data part 22 is applied to the co-processor B 12 for processing by means of a predetermined cryptographic operation. The splitter 18 also has a random input 24 by means of which the split-up into the data parts 20, 22 is random-controlled.

The CPU or the co-processor A 10 and the co-processor B 12 perform a cryptographic operation simultaneously and in parallel. Corresponding current consumption curves (current consumption amplitude with respect to time) are thereby superimposed on each other so that the individual curves of the individual devices 10, 12 and the separately performed individual processes in the processors 10, 12 can no longer be analyzed.

A first result 26 comes from the CPU or co-processor A 10 and a second result 28 comes from the co-processor B 12, which are combined in a recombiner 30 to an overall result again and applied to the data output 16. The splitter 18 informs the recombiner 30 via a connection 32 in what way the sub-results 26, 28 are to be recombined. This is necessary because the split-up by the splitter 18 is always performed in a randomly different manner due to the random input 24.

An arrow or a time axis 34 visualizes the data flow with respect to time through the device according to the invention. The data reach the data input 14, in the FIGURE on the left-hand side of the device, reach the processors 10, 12 via two parallel data paths 20, 22, are further processed in the processors 10, 12 and are recombined via the paths 26, 28 whereafter they leave the device on the right-hand side in the FIGURE via the data output 16. On the side of the data input 14, these data comprise, for example, a cryptographic key or operand which are submitted to a cryptographic operation in the processors 10, 12 for the purpose of authentication, while an authentication is assumed to be only successful or positive when a predetermined result reaches the data output 16.

To encrypt the temporal fluctuations of the current consumption during the cryptographic operation, which current consumption could allow a conclusion about the cryptographic operations or the correct cryptographic key in the Differential Power Analysis, the processors are controlled by the control unit formed by the splitter 18 and the recombiner 30 in such a way that the two processors 10, 12 perform a cryptographic operation simultaneously and in parallel so that their current consumption curves are superimposed on each other and can no longer be analyzed separately. In other words, a separation of the externally measurable time variation of the overall current is no longer possible.

The key is split up into, for example, two data parts 20, 22 which are subjected to separate cryptographic operations in the processors 10, 12, and the individual results are recombined. Alternatively, exactly the same cryptographic operation is performed in the two processors 10, 12, but only one processor 10 or 12, for example, the CPU or the co-processor A 10, receives the correct key while the other processor, for example, the co-processor B 12 receives a false key. The splitter 18 informs the recombiner 30 via the connection 32 that it has to reject the second result 29 and should only pass the first result 26 from the CPU or the co-processor A 10 to the data output 16. When the false key applied to the co-processor B 12 is the complement of the correct key applied to the CPU or the co-processor A 10, then complementary current consumption values rendering a Differential Power Analysis actually impossible are obtained in the two processors 10, 12 when performing the cryptographic operation.

The split-up of the cryptographic operation into the two processors 10, 12 is performed in such a way that the typical current consumption characteristics of the cryptographic operation of a single circuit part 10, 12 will never become visible without a parallel operation of the other circuit part 10, 12, i.e. CPU or co-processor A 10 or co-processor B 12.

The control unit 18, 30 performs the split-up into parts, for example, in that it is decided in a random-controlled manner which circuit part 10, 12 performs the relevant cryptographic operation. The circuit part 10, 12 which is not relevant at this instant performs an appropriate cryptographic operation (dummy operation) in parallel therewith, which is shown completely equivalently in the current characteristic but is indispensable for the overall computation.

Parts of a DES (Data Encryption Standard) encryption are, for example, exchanged continuously, or only the left or right partial encryptions are only partly exchanged in the two circuit parts 10, 12 in randomly selected rounds.

Alternatively, the relevant DES operations are randomly distributed between the two circuit parts 10 and 12 when computing a triple DES (a multi-stage encryption) so that it is never predictable which circuit part 10 or 12 is in the process of performing the relevant cryptographic operation. In the control of the two circuit parts 10, 12, it should be noted that their typical frequency spectrum should be identical at least in parts so that superpositions of the two current consumption profiles can neither be separated in the frequency space by means of a Fourier transform.

LIST OF REFERENCE SIGNS

10 central processing unit (CPU)
12 co-processor
14 data input
16 data output
18 splitter
20 first data part
22 second data part
24 random input
26 first result
28 second result
30 recombiner
32 connection between splitter and recombiner
34 time axis

The invention claimed is:

1. A method of operating a data-processing device with an integrated circuit comprising two or more processors in which the integrated circuit performs cryptographic operations, the method comprising:

performing cryptographic operations in the integrated circuit, wherein at least two processors perform the cryptographic operations simultaneously and in parallel, wherein the cryptographic operations of at least one processor are useful operations and the cryptographic operations performed by at least one other processor are dummy operations whose results are rejected, and wherein the selection as to which of the two or more processors performs a useful operation is randomly controlled, and wherein consumption characteristics of the data-processing device being a superimposition of consumption characteristics associated with performing both useful and rejected cryptographic operations, whereby reconstruction of the consumption characteristics associated with performing any of the useful cryptographic operations is impeded.

2. A method as claimed in claim 1, wherein the two or more processors comprise a CPU and at least one co-processor.

3. A method as claimed in claim 1, wherein a cryptographic operation is split up into at least two sub-operations and at least one of the at least two sub-operations is a useful operation and at least one of the at least two sub-operations is a dummy operation.

4. A method as claimed in claim 3, wherein subsequently corresponding sub-results from the respective sub-operations are combined to an overall result of the overall cryptographic operation.

5. A method as claimed in claim 3, characterized in wherein the split-up of the cryptographic operation into sub-operations is randomly controlled.

6. A method as claimed in claim 4, characterized in that the sub-operations are parts of an encryption in accordance with Data Encryption Standard (DES).

7. A data-processing device with an integrated circuit, comprising:

two or more processors, a control unit which controls the two or more processors so that, in the case of a cryptographic operation, at least one processor performs a cryptographic operation simultaneously and in parallel with the performance of a dummy operation by at least one other processor, and wherein the selection as to which of the two or more processors performs a useful operation is randomly controlled, whereby consumption characteristics associated with performing the respective cryptographic and dummy operations are superimposed so that reconstruction of the consumption characteristics associated with performing the cryptographic operation is impeded.

8. A data-processing device as claimed in claim 7, wherein the control unit comprises a splitter which splits a cryptographic operation into at least two sub-operations, and at least one of the at least two sub-operations is a useful operation and at least one of the at least two sub-operations is a dummy operation.

9. A data-processing device as claimed in claim 7, wherein the control unit further comprises a recombiner which recombines each sub-result of the sub-operations simultaneously performed and wherein the at least one dummy operation results are rejected to produce an overall result of the overall cryptographic operation.

10. A data-processing device as claimed in claim 9, wherein the recombiner rejects the relevant result of the at least one processor that performed such dummy operation.

11. A data-processing device as claimed in claim 7, wherein the two or more processors comprise a CPU and at least one co-processor.

* * * * *